(12) United States Patent
Wu

(10) Patent No.: US 6,252,584 B1
(45) Date of Patent: Jun. 26, 2001

(54) DETECTING DEVICE OF AN ENCODER

(75) Inventor: John Wu, Taipei (TW)

(73) Assignee: Lite-On Electronics, Inc., Taipei (TW)

( * ) Notice: Subject to any disclaimer, the term of this patent is extended or adjusted under 35 U.S.C. 154(b) by 0 days.

(21) Appl. No.: 09/196,322

(22) Filed: Nov. 20, 1998

(51) Int. Cl.[7] .................................. G09G 5/08
(52) U.S. Cl. .......................................... 345/166
(58) Field of Search ................ 345/165, 166, 345/167, 168

(56) References Cited

U.S. PATENT DOCUMENTS

| | | | |
|---|---|---|---|
| 5,680,157 | * 10/1997 | Bidiville et al. | 345/165 |
| 5,703,356 | * 12/1997 | Bidiville et al. | 345/167 |
| 5,777,605 | * 7/1998 | Yoshinobu et al. | 345/173 |

* cited by examiner

Primary Examiner—Richard Hjerpe
Assistant Examiner—Ronald Laneau
(74) Attorney, Agent, or Firm—Rosenberg, Klein & Lee

(57) ABSTRACT

A detecting device of an encoder is disclosed. The detecting device comprises a photodetector and a detection circuit. The photodetector has three active areas, and the detection circuit compares each two of the electric signals outputted from the three active areas for deriving a digital waveform with a desired phase and duty cycle. Thus, the digital signal may be correctly decoded into a vector data by a digital circuit in the next stage. The shift of signal level induced from the decay of LED may be avoided. The defect of a prior art optomechanical encoder is also avoided. In the prior art encoder, a fixed voltage is used as a comparing voltage and thus the encoded signal could be too strong or too weak due to the variation of the sensitivities of different photodetectors and the difference in the light intensities of the LEDs.

15 Claims, 8 Drawing Sheets

DETECTING DEVICE OF AN ENCODER

BACKGROUND OF THE INVENTION

1. Field of the Invention

The present invention relates to a detecting device of an encoder, especially to an optomechanical encoder used in a computer mouse or in a related pointing device.

2. Background of the Invention

The conventional mouse uses a detecting circuit with a conventional optomechanical encoder, as shown in FIG. 1. The detecting circuit is formed by a photodetector 11 and a detection circuit 12. The photodetector 11 is of the type of a phototransistor with two active areas P1 and P2 (as shown in FIG. 2) for receiving the optical signals from the working light beam through a code wheel 3, transferring the optical signals into electric signals, and then outputting the electric signals to a detection circuit 12. The detection circuit 12 is installed with two comparators OP1 and OP2. The input positive end (+) of the first comparator OP1 is connected with the output of the first active area P1 and further connected with a resistor R1 and the negative end (−) thereof is connected with resistors R2 and R3. The other end of the resistor R2 is connected with the other end of the resistor R1. The other end of the resistor R3 is connected with a power source VDD.

The input positive end of the second comparator OP2 is connected with the output of the second active area P2 and further connected with a resistor R4 and the negative end (−) thereof is connected with resistors R5 and R6. The other end of the resistor R5 is connected with another end of the resistor R4. The other end of the resistor R6 is connected with a power source VDD.

By the above connection, each of the input negative ends (−) of the comparators OP1 and OP2 may connect with a fixed reference voltage Vref1 and Vref2, wherein $Vref1=VDD \times R2/R2+R3)$ $Vref2=VDD \times R5/(R5+R6)$ The active area P1 and P2 (as shown in FIG. 2) for receiving the optical signals from the working light beam through a code wheel 3 are easily affected by the sensitivity of the photodetector 11 and the light intensity of the light emitting source LED, and thus the output encoding signal is also affected, as shown in FIG 3. After comparing the level of the encoding signals with the fixed reference voltages Vref1 and Vref2 by the comparators OP1 and OP2, respectively, digital waveforms with different phase periods and pulse width are obtained, as shown in FIG. 4.

The aforementioned circuit has the following drawbacks in applications:

1) Since a fixed reference voltage (Vref) is used as a bigger voltage in the detecting circuit for digital wave shaping, the magnitude of the encoding signal could be too strong or too weak, depending on the sensivities of the photodetectors and the light intensity of the light source LED. Therefore, it is necessary to classify and match different LEDs and photodetector Since the reference voltage in the detecting circuit is performed by a fixed voltage, it is difficult to control the the duty cycle of the output signals (A, B) and the phase differences are difficult to be controlled. Therefore, the vector data can not be provided correctly. If this occurs in a mouse, the mouse will lose counts and become motionless.

2) The manufacture of the photodetectors and LEDs must classify and match the photodetectors and LEDs correctly in order to satisfy the requirement of the manufacturer of mice. Thus troubles in inventory and assembling are induced.

3) For the manufacture of mice, the produced mice are probably not good and the quality thereof is difficult to be controlled because of the assembly tolerance and decay of the LEDs in a mouse and the variation of the IC comparing voltage.

SUMMARY OF THE MENTION

Accordingly, the object of the present invention is to provide a detecting device of an encoder, wherein the detecting device comprises a photodetector and a detection circuit. The photodetector has three active areas, and the detection circuit compares each two of the electric signals outputted from the three active areas to output digital waveforms with suitable phase and suitable duty cycle. Thus, the digital signal may be correctly decoded into vector information by a digital circuit in next stage (such as a decoding and processing circuit 5, as shown in FIG. 5).

A further object of the present invention is to provide a detecting device of an encoder, by which the trouble induced from the matching and classification of the opto components is solved.

Another object of the present invention is to provide a detecting device encoder, by which the decay problem of a LED may be overcome, the design margin increased, the yield ratio is increased and the quality of products are improved.

A further object of the present invention is to provide a detecting device of an encoder, in which the photodetector and the detection circuit are integrated as a single component.

A further object of the present invention is to provide a detecting device of an encoder, in which the detection circuit may be incorporated into the control IC of a computer pointing device (foe example, a computer mouse).

A further object of the present invention is to provide a computer mouse having said photodetector.

A further object of the present invention is to provide a computer pointing device with said photodetector.

The shift of signal level induced from the decay of LEDs may be dispelled and the defect of a prior art optomechanical encoder is avoided, in which a fixed voltage is used as a comparing voltage and thus makes the signal too strong or too weak to output a correct encoding signal due to the differences in the sensitivities of different photodetectors and the variations of the intensities of the LEDs.

The present invention will be better understood and its numerous objects and advantages will become apparent to those skilled in the art by referencing to the following drawings in which:

DETAILED DESCRIPTION OF THE PREFERRED EMBODIMENT

Figure 5:
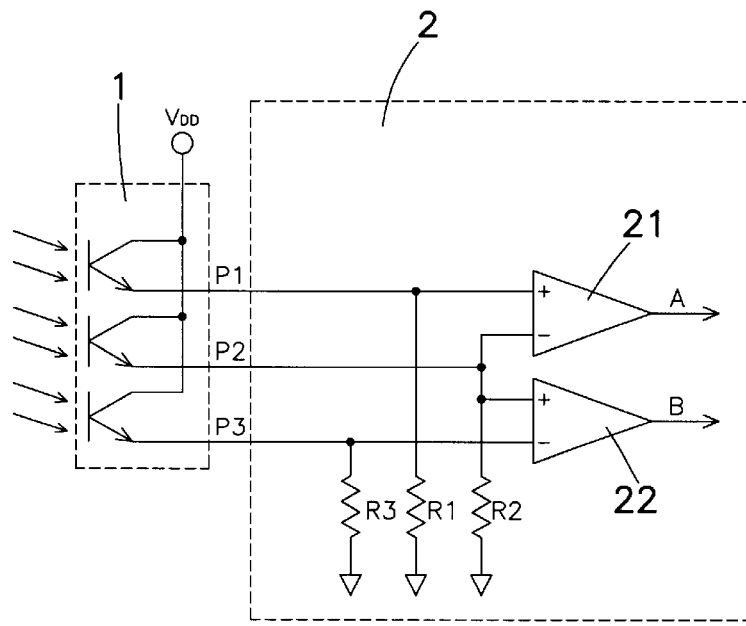
FIG. 5 shows the detection circuit of the optomechanical encoder according to the present invention.

As shown in FIG. 5, the detecting device of an encoder of the present invention is an optomechanical encoder which may be employed in a computer mouse and the related pointing device. The detecting device of the encoder comprises a photodetector 1 and a detection circuit 2.

Figure 2:
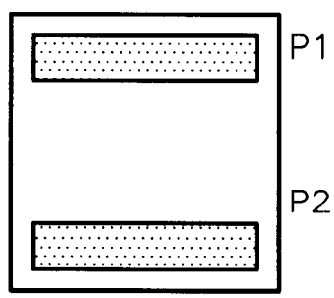
FIG. 2 is a schematic view of a photodetector with two active areas.
Figure 7:
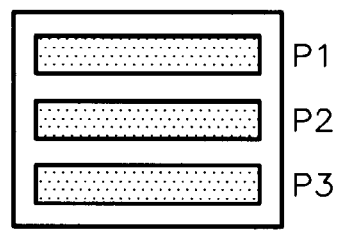
FIG. 7 shows the schematic view of the three active areas of the photodetector according to the present invention.
Figure 3:
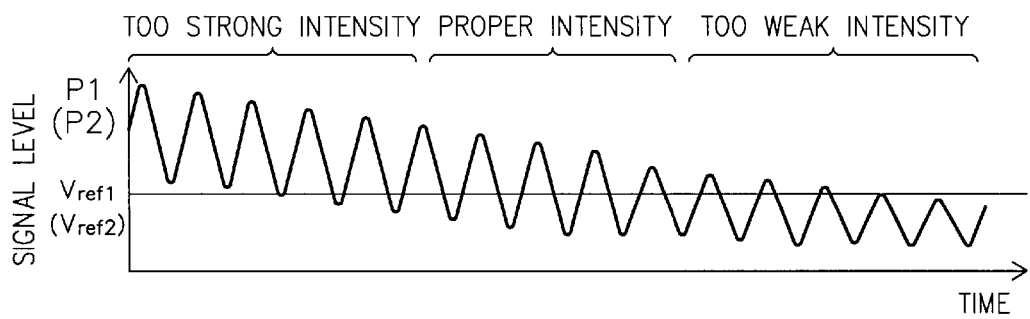
FIG. 3 shows the waveform of the output signal of the active areas in the photodetector.
Figure 4:
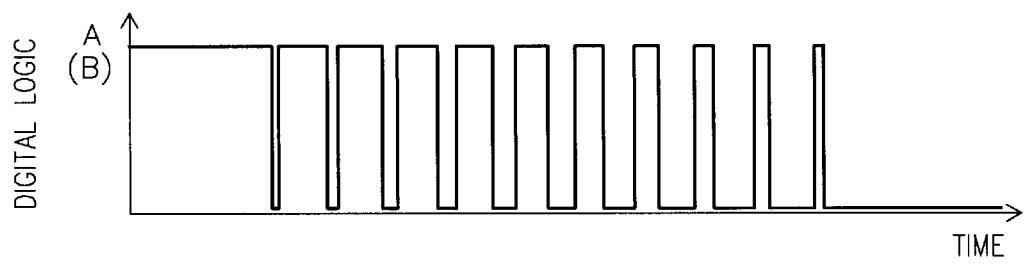
FIG. 4 shows the waveform of the output A and B of a prior art detection circuit.
Figure 6:
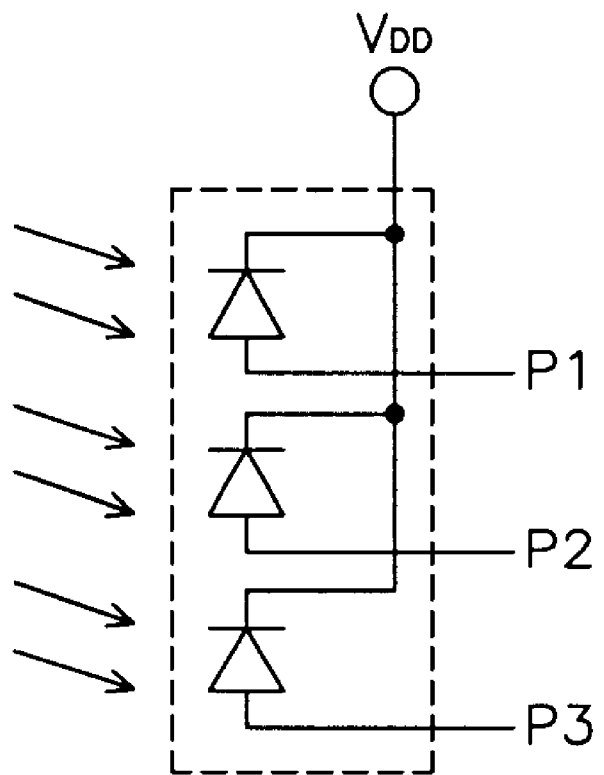
FIG. 6 is a schematic view of another type of the photodetector according to the present invention.
Figure 8:
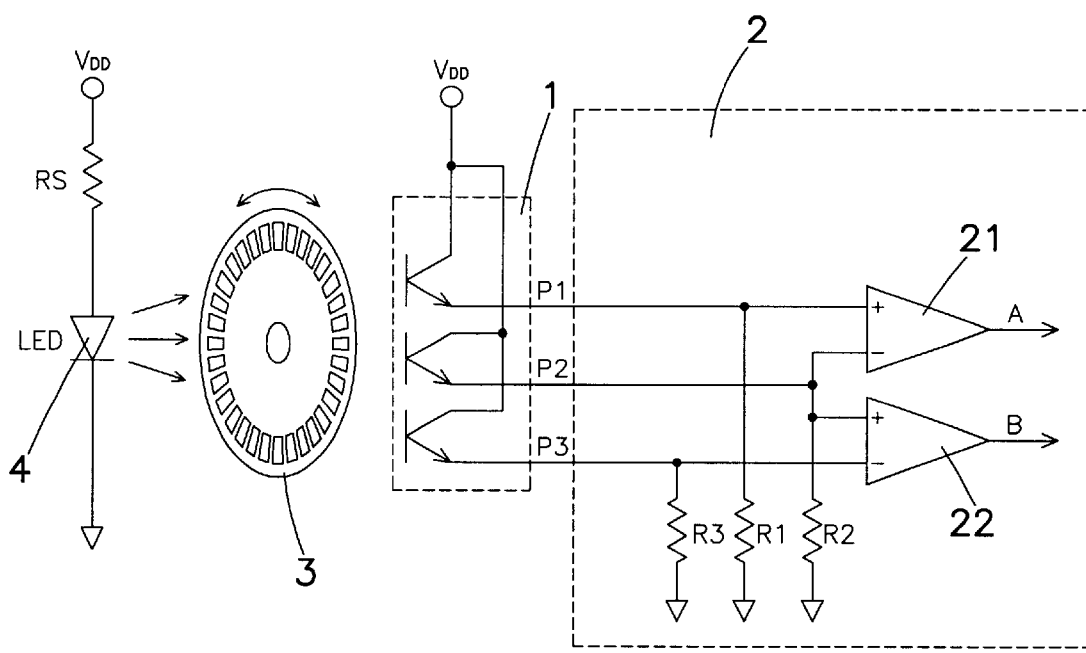
FIG. 8 shows the embodiment about the application of the present invention.
Figure 12:
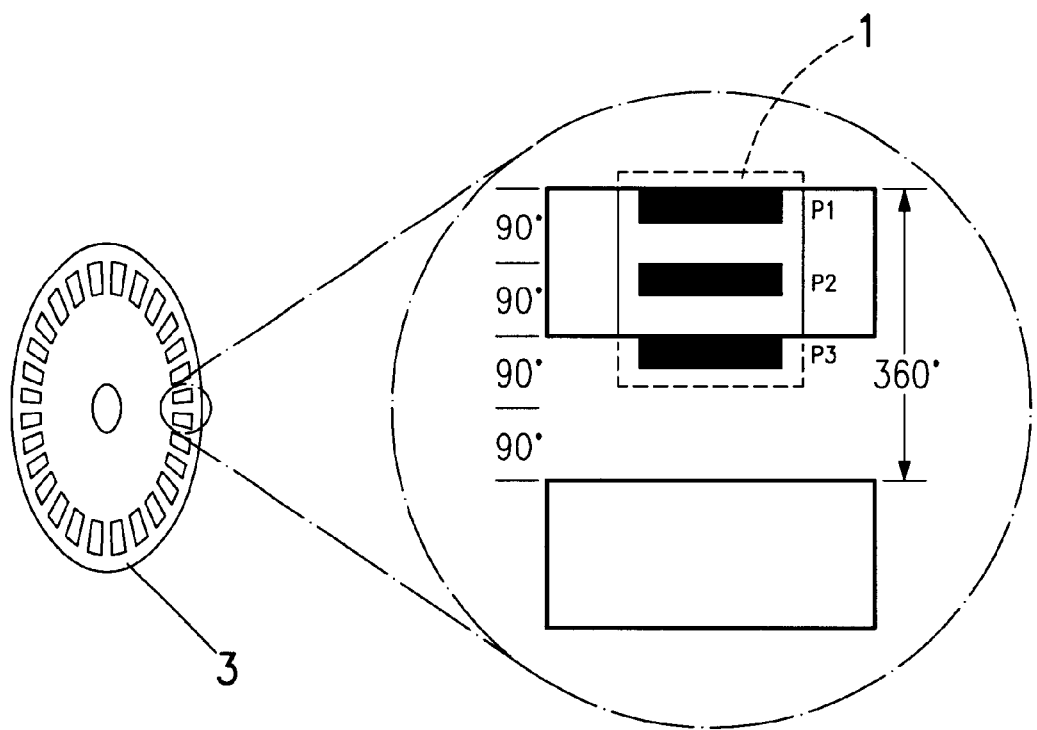
FIG. 12 is a schematic view showing the relation among the spacing of the active areas P1, P2 and P3, and the length and phase of the light through hole of a code wheel.

In the embodiment of the present invention, the photodetector 1 is of the type of a phototransistor (which may also be the type of photodiode, as shown in FIG. 6). The photodetector 1 has three active areas P1, P2, and P3, as shown in FIG. 7. The spacing between the three active areas approximately equal to half of the width of the optical through hole of the code wheel, as shown in FIG. 12, and has a phase difference of 90 degrees with respect to the through hole of the code wheel corresponding to each of the three active areas, respectively Each of the active areas P1, P2 and P3 receives the optical signals from the photo beam through the code wheel, transfers them into electric signal, and then outputs the electric signal to the respect detection circuit 2, as shown in FIG. 2.

The detection circuit 2 includes two comparators 21, 22, wherein the input positive end (+) of the first comparator 21 is connected with the output of the first active area P1 and further connected with a resistor R1. The negative end (−) of the input is connected with the output of the second active area P2 and further connected with the positive end (+) of the input of second comparator 22. The negative end (−) of the input of second comparator 22 is connected with the output of third active area P3 and connected with a resistor R3. The other end of the resistor R3 is connected with the other end of the resistors R1 and R2.

In the detection circuit 2, each two of the output of the three active areas P1, P2 and P3 are compared so as to output a suitable phase and a suitable duty cycle. The output signal of the first active area P1 is compared with that of the second active area P2. The output signal of the second active area P2 is compared with that of the third active area P3.

Figure 9:
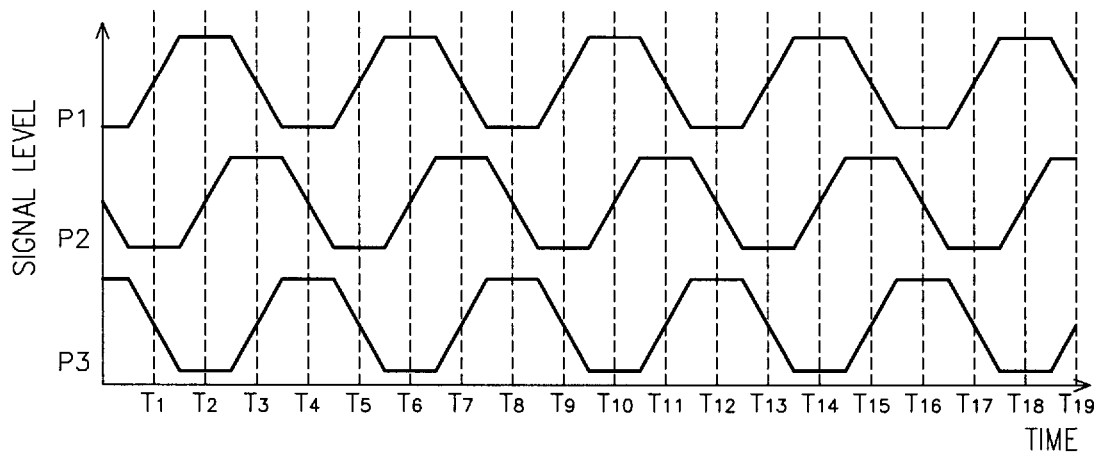
FIGS. 9 and 10 show the operation theory of the photodetector and the detection circuit according to the present invention.
Figure 10:
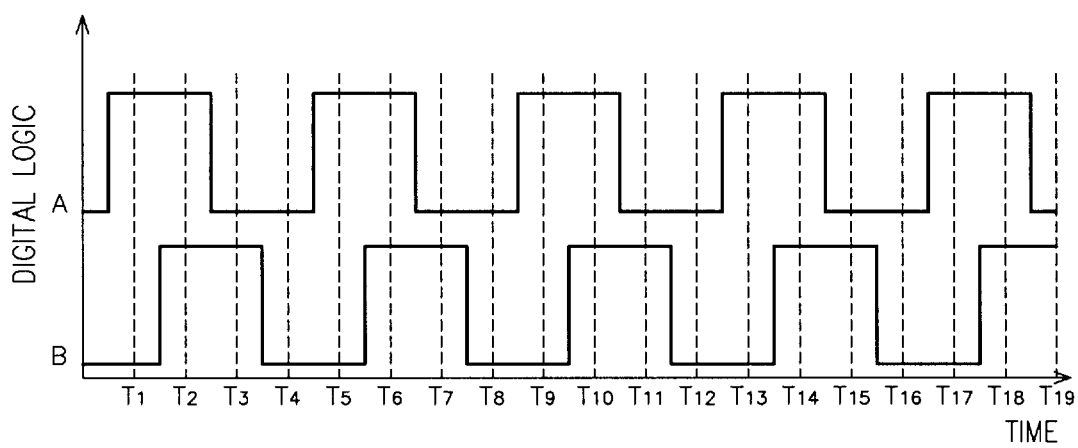

As shown in FIGS. 9 and 10, the operation principle of the photodetector and the detection circuit of optomechanical encoder according to the present invention are disclosed. At time T1, the output signal level of first active area P1 is higher than that of the second active area P2, and thus a signal of "1" is generated on the output A of the first comparator 21. The output signal level of the third active area P3 is higher than that of the second active area P2, and thus a signal of "0" is generated on the output B of the second comparator 22.

At time T2, the output signal level of the first active area P1 is higher than that of the second active area P2, and thus a signal of "1" is generated on the output A of the first comparator 21. The output signal level of the third active area P3 is lower than that of the second active area P2, and thus a signal of "1" is generated on the output B of the second comparator 22.

At time T3, the output signal level of the first active area P1 is lower than that of the second active area P2, and thus a signal of "0" is generated on the output A of the first comparator 21. The output signal level of the third active area P3 is lower than that of the second active area P2, and thus a signal of "1" is generated on the output B of the second comparator 22.

At time T4, the output signal level of the first active area P1 is lower than that of the second active area P2, and thus a signal of "0" is generated on the output A of the first comparator 21. The output signal level of the third active area P3 is higher than that of the second active area P2, and thus a signal of "0" is generated on the output B of the second comparator 22.

Following the same procedure, a desired phase and a desired duty cycle may be delivered in the output ends (A, B) of the first and second comparators (21, 22).

Figure 11:
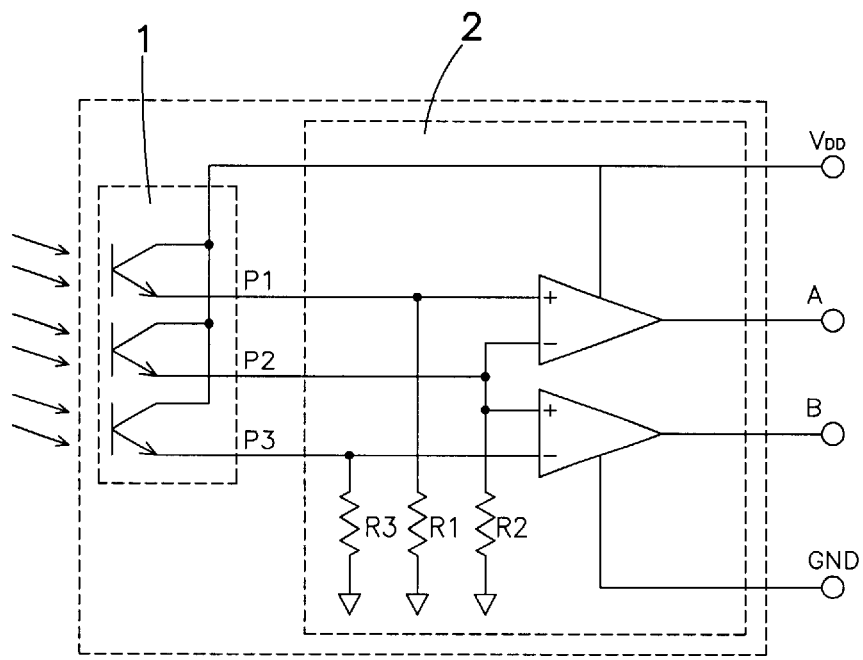
FIG. 11 is a schematic view showing dig the photodetector and the detection circuit of the present invention are combined as a signal component.
Figure 13:
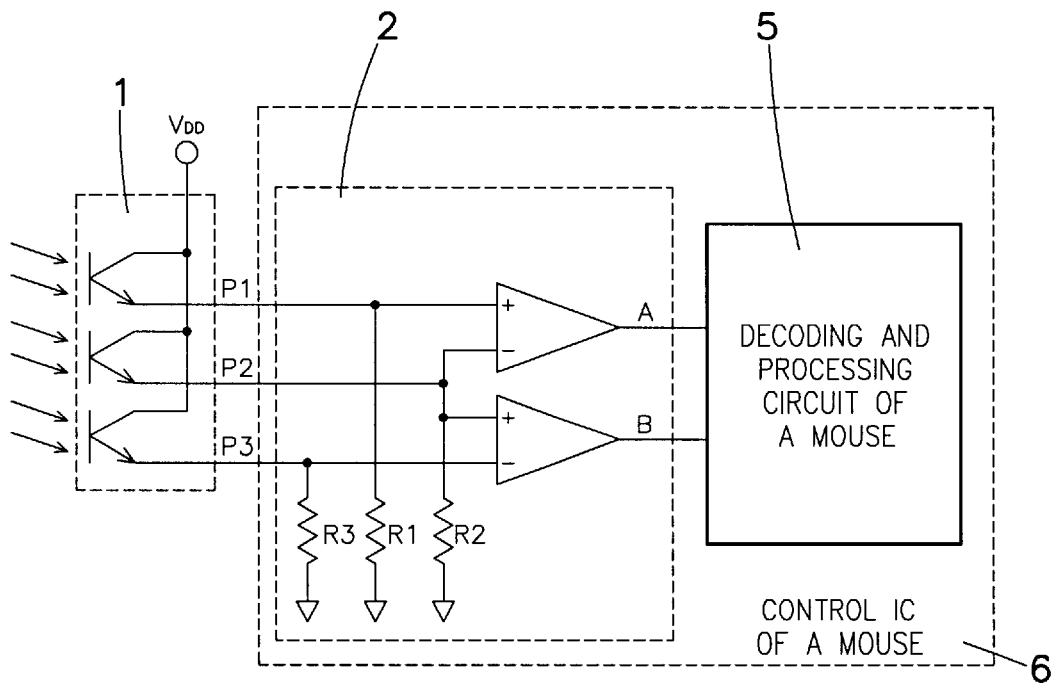
FIG. 13 is a schematic view showing that the detecting circuit and the control IC of a mouse are manufactured as an integrated components.

In addition, the photodetector 1 and the detection circuit 2 may be manufactured as two independent components, as shown in FIG. 5; or they may be combined as an single component, as shown in FIG. 11; or the detection circuit 2 may be incorporated into the control IC 6 in the computer pointing device (such as a computer mouse), as shown in FIG. 13.

In summary, the design of the detecting device of the present invention has the following advantages:

1) The defect of a prior art optomechanical encoder is avoided, in which a fixed voltage is used as a comparing voltage and thus makes the signal too strong or too weak to output a correct encoding signal due to the differences in the sensitivities of different photodetectors and the difference in the intensities of the LEDs.

2) The shift of the signal level induced from the decay of LED may be dispelled.

3) The trouble induced from the matching and classification of the opto components is overcome.

4) The design margin of a mouse is enlarged, the yield ratio is increased and the quality of products is improved.

Although the invention has been described in detail with reference only to a preferred embodiment, those skilled in the art will appreciate that various modifications can be made without departing from the spirit of the invention. Accordingly, the invention is defined only by the following claims which are intended to embrace all equivalents thereof.

Figure 1:
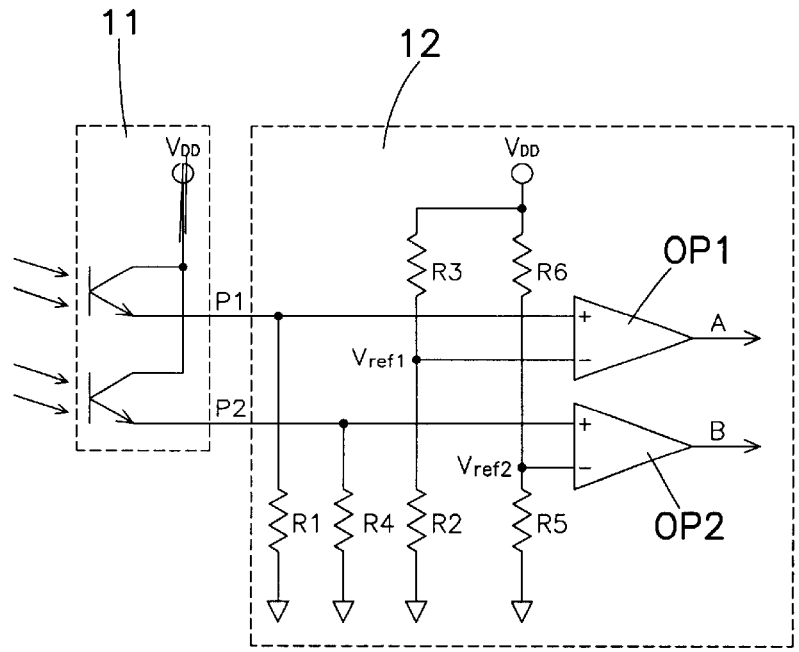
FIG. 1 shows the detection circuit of a prior art optomechanical encoder.

DESCRIPTION OF THE NUMERALS IN FIGURES 1 photodetector
P1 first active area
P2 second active area
P3 third active area
2 detection circuit
21 first comparator
22 second comparator
R1 Resistor
R2 Resistor R3 Resistor
3 code wheel
4 light emitting diode
5 decoding and processing circuit
6 control IC of a mouse

What is claimed is:

1. A detecting device of an encoder used in an optomechanical encoder of a related pointing device, comprising:

a photodetector having a first, a second and a third active area, each of the active areas receiving light signals from a working light beam through optical through holes of predetermined width of a code wheel and outputting electric signals responsive thereto, the first, second and third active areas being spaced one from an adjacent other by a distance approximating one half the predetermined width of the optical through holes; and a detection circuit including a first and a second comparator unit, wherein a first input of the first comparator unit is connected with an output of the first active area, a second input thereof is connected with an output of the second active area, and is further connected with a first input of the second comparator unit, a second input of second comparator unit is connected with an output of the third active area, whereby the detection circuit compares each two of the electric signals outputted from the three active areas for delivering a predetermined phase greater than 0 degrees and less than 180 degrees, and a predetermined duty cycle.

2. The detecting device of an encoder as recited in claim 1, wherein each of the comparator units comprises a voltage comparator.

3. The detecting device of an encoder as recited in claim 2, wherein the detection circuit may be installed within a control IC of a computer pointing device.

4. The detecting device of an encoder as recited in claim 3, wherein the photodetector is of a type of a phototransistor.

5. The detecting device of an encoder as recited in claim 3, wherein the photodetector is of a type of a photodiode.

6. The detecting device of an encoder as recited in claim 2, wherein the detection circuit may be installed within a control IC of a mouse.

7. The detecting device of an encoder as recited in claim 2, wherein the photodetector is of a type of a phototransistor.

8. The detecting device of an encoder as recited in claim 2, wherein the photodetector is of a type of a photodiode.

9. The detecting device of an encoder as recited in claim 1, wherein the detection circuit may be installed within a control IC of a computer pointing device.

10. The detecting device of an encoder as recited in claim 9, wherein the computer pointing device comprises a mouse.

11. The detecting device of an encoder as recited in claim 9, wherein the photodetector is of a type of a phototransistor.

12. The detecting device of an encoder as recited in claim 9, wherein the photodetector is of a type of a photodiode.

13. The detecting device of an encoder as recited in claim 1, wherein the photodetector may be of a type of a phototransistor.

14. The detecting device of an encoder as recited in claim 1, wherein the photodetector may be of a type of photodiode.

15. The detecting device of an encoder as recited in claim 1, wherein the photodetector and the detection circuit may be combined as a single element.

* * * * *